United States Patent
Gu

(10) Patent No.: US 8,587,272 B2
(45) Date of Patent: Nov. 19, 2013

(54) BALANCING TEMPERATURES IN A MULTI-PHASE DC/DC CONVERTER

(75) Inventor: Yiding Gu, Pleasanton, CA (US)

(73) Assignee: Linear Technology Corporation, Milpitas, CA (US)

( * ) Notice: Subject to any disclaimer, the term of this patent is extended or adjusted under 35 U.S.C. 154(b) by 321 days.

(21) Appl. No.: 13/115,924

(22) Filed: May 25, 2011

(65) Prior Publication Data

US 2012/0299560 A1    Nov. 29, 2012

(51) Int. Cl.
- G05F 1/59 (2006.01)
- G05F 1/618 (2006.01)

(52) U.S. Cl.
USPC ............................................... 323/272

(58) Field of Classification Search
USPC .......... 323/225, 268, 271, 272, 285, 350, 907
See application file for complete search history.

(56) References Cited

U.S. PATENT DOCUMENTS

| | | | |
|---|---|---|---|
| 7,615,982 B1 * | 11/2009 | Guo | 323/285 |
| 7,960,951 B2 * | 6/2011 | Southwell et al. | 323/272 |
| 2006/0139016 A1 * | 6/2006 | Schuellein et al. | 323/272 |
| 2011/0115447 A1 * | 5/2011 | Lin et al. | 323/234 |

* cited by examiner

*Primary Examiner* — Gary L Laxton
(74) *Attorney, Agent, or Firm* — Patent Law Group LLP; Brian D Ogonowsky

(57) ABSTRACT

A temperature compensation circuit is used in a peak current control multi-phased DC/DC converter. Each phase has a duty cycle needed to generate a regulated output voltage of the converter. The temperature for each phase in the converter is sensed to generate corresponding first signals for all the phases. The first signals are averaged to generate a second signal corresponding to the average temperature of all the phases. For each phase, a third signal is generated corresponding to the difference between the first signal and the second signal. The third signal is then used to adjust the duty cycle of each phase to control the temperature of each phase to be substantially equal to the average temperature. In the steady state, the output voltage of the converter will be the desired voltage and the temperatures of the phases will be balanced.

18 Claims, 3 Drawing Sheets

BALANCING TEMPERATURES IN A MULTI-PHASE DC/DC CONVERTER

FIELD OF THE INVENTION

This invention relates to multi-phase DC/DC converters and, in particular, to the thermal control of each phase of the converter.

BACKGROUND

Multi-phase DC/DC converters are generally used for high current applications, such as for generating a load current of 100 A or more. Employing multiple phases of the converter allows a sharing of the current generation, lowers ripple, and achieves other well known benefits. There may be two or more phases. Each phase should be identical for optimal operation, but this is impossible to achieve due to practical considerations.

For a multi-phase current mode DC/DC converter, each phase generally comprises a pulse width modulation (PWM) comparator, an RS flip flop for turning a transistor switch on and off at a certain duty cycle to achieve regulation, an inductor, and a current sense device such as a low value resistor. The turn-on time for each phase is controlled by a phased clock. When a switch turns on, a ramping current flows through its associated inductor. The phased ramping currents through the inductors are filtered by an output capacitor common to all phases. An error amplifier compares the output voltage of the converter to a reference voltage and generates a control voltage whose level corresponds to the duty cycle of the phases needed to maintain the output voltage at the desired voltage. The PMW comparator for each phase then compares the control voltage level to the current ramp through the inductor. When they cross, the RS flip flop controls the switch to turn off. In this manner, ideally, each phase is controlled to have the same duty cycle and contributes an equal amount of current to the load.

The temperatures of the various phases are slightly different due to at least the following factors: 1) the different physical positions of the various phases on a circuit board; 2) unequal cooling of the phases by forced air flow and heat sinking; and 3) non-matching components. This difference in operating temperatures causes the electrical characteristics of the phases (e.g., the on-resistances of MOSFET switches, the inductances, the current sense resistances, etc.) to be affected differently, resulting in non-matching currents being supplied at the same duty cycles and increased ripple. Such temperature imbalances may also result in "hot spots" that reduce the reliability and performance of the system.

This problem applies to all types of multi-phase DC/DC converters that use a sensed current in the feedback loop for regulation.

What is needed is a technique for balancing the temperatures of the various phases in a multi-phase DC/DC converter.

SUMMARY

In one embodiment, a thermal compensation circuit is provided for each phase of a multi-phase DC/DC converter. Each compensation circuit has a temperature sensor that is used to generate a "first signal" for each phase corresponding to the temperature of that phase. The temperature may represent the temperature of the inductor or MOSFET switch for that phase, since those components conduct the full average current for that phase. An increased average current increases the temperature of those components.

The "first signals" for all the phases are averaged to generate a "second signal."

For each phase, a "third signal" is generated corresponding to the difference between the "first signal" and the "second signal." The "third signal" for each phase is then used to separately adjust the duty cycle of each phase to control the temperature of each phase to be substantially equal to the average temperature (i.e., cause the "first signal" to equal the "second signal" for each phase). Some duty cycles may be increased while other duty cycles may be decreased until a steady state condition is reached. Accordingly, the temperatures of the phases will be balanced. As a result, the output voltage of the converter should be more optimally regulated during steady state operation, with lower ripple due to the improved matching of performance of the phases.

In one embodiment, the duty cycles are adjusted by the thermal compensation circuits effectively offsetting the control voltage applied to each PWM comparator in each phase.

Various embodiments are described.

BRIEF DESCRIPTION OF THE DRAWINGS

Elements that are the same or equivalent are labeled with the same numeral.

DETAILED DESCRIPTION

Figure 1:
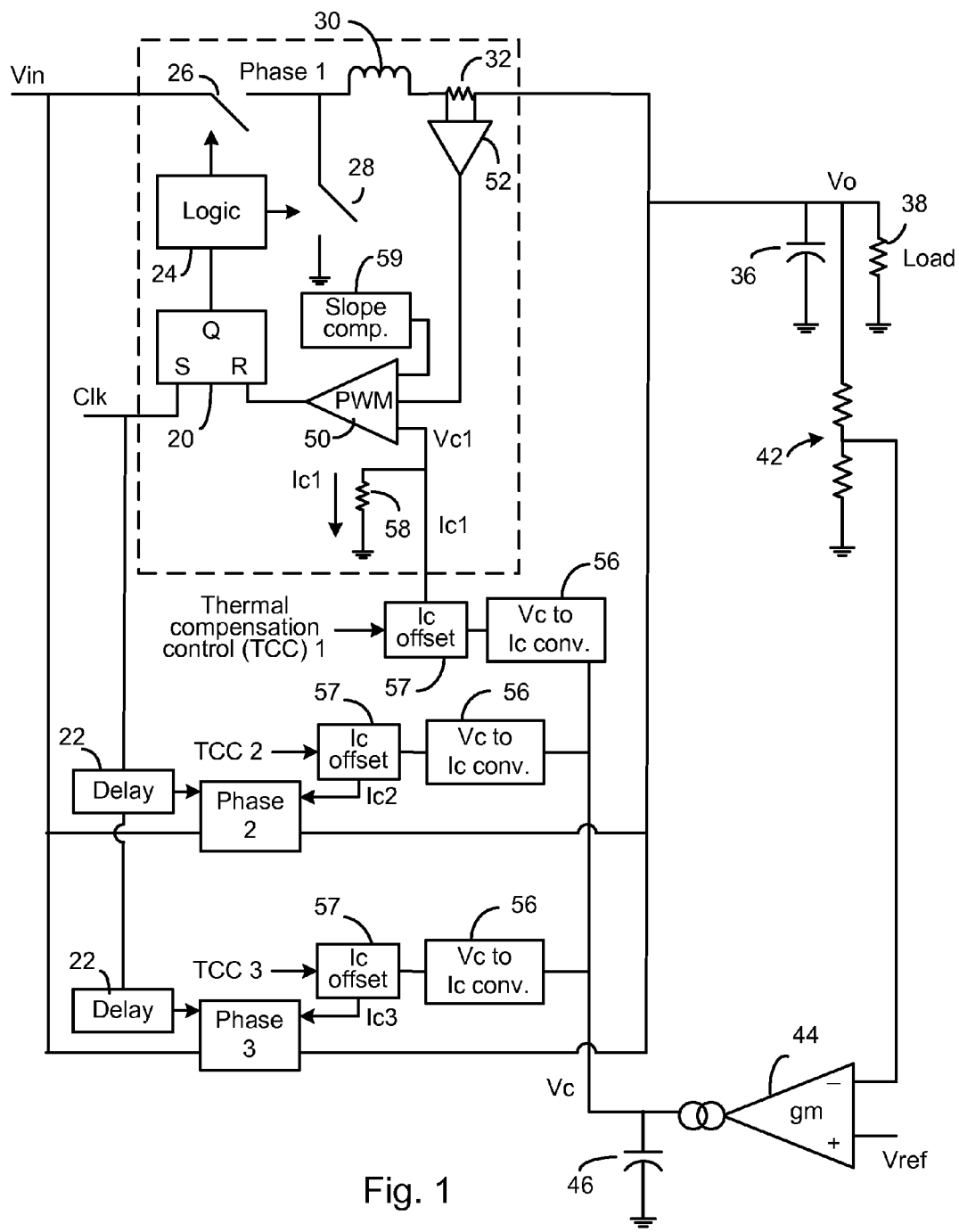
FIG. 1 illustrates one type of multi-phase DC/DC converter (only one phase is shown in detail), where the duty cycle of each phase is adjusted by a thermal compensation circuit to balance the temperatures of the phases.

FIG. 1 illustrates one type of multi-phase DC/DC converter using thermal compensation, in accordance with one embodiment of the present invention. Many other types of multi-phase converters can also benefit from the present invention. The particular type of converter shown is a peak current-mode controlled converter.

The operation of the converter portion of FIG. 1 is conventional and is as follows.

Three phases (phase 1-phase 3) are shown in FIG. 1, although the invention may be applied to any number of phases. Only the components in phase 1 are shown for simplicity. A clock (Clk) signal for each phase is applied to the set input of an RS flip flop 20. Each Clk signal is phase-delayed relative to the other by a delay circuit 22.

The setting of the RS flip flop 20 generates a high signal at its Q output. A logic circuit 24, in response, turns transistor switch 26 on and turns the synchronous rectifier switch 28 off. Both switches may be MOSFETs or other transistors. The logic circuit 24 ensures that there is no cross-conduction. The input voltage Vin coupled to an inductor 30 through the switch 26 causes a ramping current to flow through the inductor 30, and this current flows through a low value sense resistor 32. The ramping current is filtered by an output capacitor 36 and supplies current to the load. The output capacitor 36 is shared by all phases and smoothes out ripple.

The output voltage Vo is applied to a voltage divider 42, and the divided voltage is applied to an input of a transconductance amplifier 44. A reference voltage Vref is applied to the other input of the amplifier 44. The output current of the amplifier 44 corresponds to the difference between the actual output voltage and the desired output voltage. The voltage (a control voltage Vc) across a capacitor 46 at the output of the amplifier 44 is adjusted up or down based on the positive or negative current output of the amplifier 44. Since the control voltage Vc at the capacitor 46, among other things, sets the duty cycles of the phases, the level of the control voltage Vc is that needed to equalize the inputs into the amplifier 44.

Ignoring the thermal compensation circuitry for simplicity, the control voltage Vc is applied to a PWM comparator 50. The voltage across the sense resistor 32 is sensed by a differential amplifier 52, having a certain gain, and, when the ramped current through the sense resistor 32 exceeds the control voltage Vc, the PWM comparator 50 is triggered to output a reset signal to the RS flip flop 20. This turns the charging switch 26 off and turns the synchronous rectifier switch 28 on to discharge the inductor 30, causing a downward ramping current. In this way, the peak current through the inductor 30 for each phase is regulated to cause a desired output voltage Vo.

In the description above, the duty cycles of the three phases are identical irrespective of the different temperatures of the three phases. Accordingly, the electrical characteristics of the three phases, which fluctuate with temperature, will be different, resulting in unmatched currents provided by the phases. This leads to various problems such as increased ripple and over-current issues.

The present invention changes the above-described conventional operation by adjusting the duty cycles of the phases so that the temperatures are matched, while the converter still outputs the desired regulated voltage.

In the example shown in FIG. 1, the thermal compensation control signal (TCC1, TCC2, TCC3) for each of the three phases offsets the control voltage Vc up or down for each of the three phases to change the duty cycles of the phases until the measured temperatures of the three phases are equal. The duty cycles can be controlled in other ways, also envisioned by the present invention, such as offsetting the current sense signal or adjusting any other suitable signal in the feedback path.

In the example of FIG. 1, the control voltage Vc is converted into a corresponding current at each of the phases by the Vc to Ic converter circuit 56, using any of a number of well known techniques. A derived TCC signal (TCC1, TCC2, TCC3) is then applied to each Ic signal to add current or subtract current, shown as the Ic offset circuit 57 (which may simply be a node). The resulting currents (Ic1, Ic2, Ic3) are then converted back into control voltages (e.g., Vc1) by a resistor 58, assuming the PWM comparator 50 has a suitably high input impedance. The current offsets are those needed to cause the measured temperatures of the phases to be matched, irrespective of the relative duty cycles.

FIG. 1 also illustrates a conventional slope compensation circuit 59, as is well known. At high duty cycles (typically greater than 50%), the slope compensation circuit 59 turns off the switch 26 before the inductor current ramp crosses the control voltage Vc to reduce sub-harmonic oscillations that may occur at the high duty cycles. The effect of the slope compensation circuit 59 is unrelated to the present invention.

Figure 2:
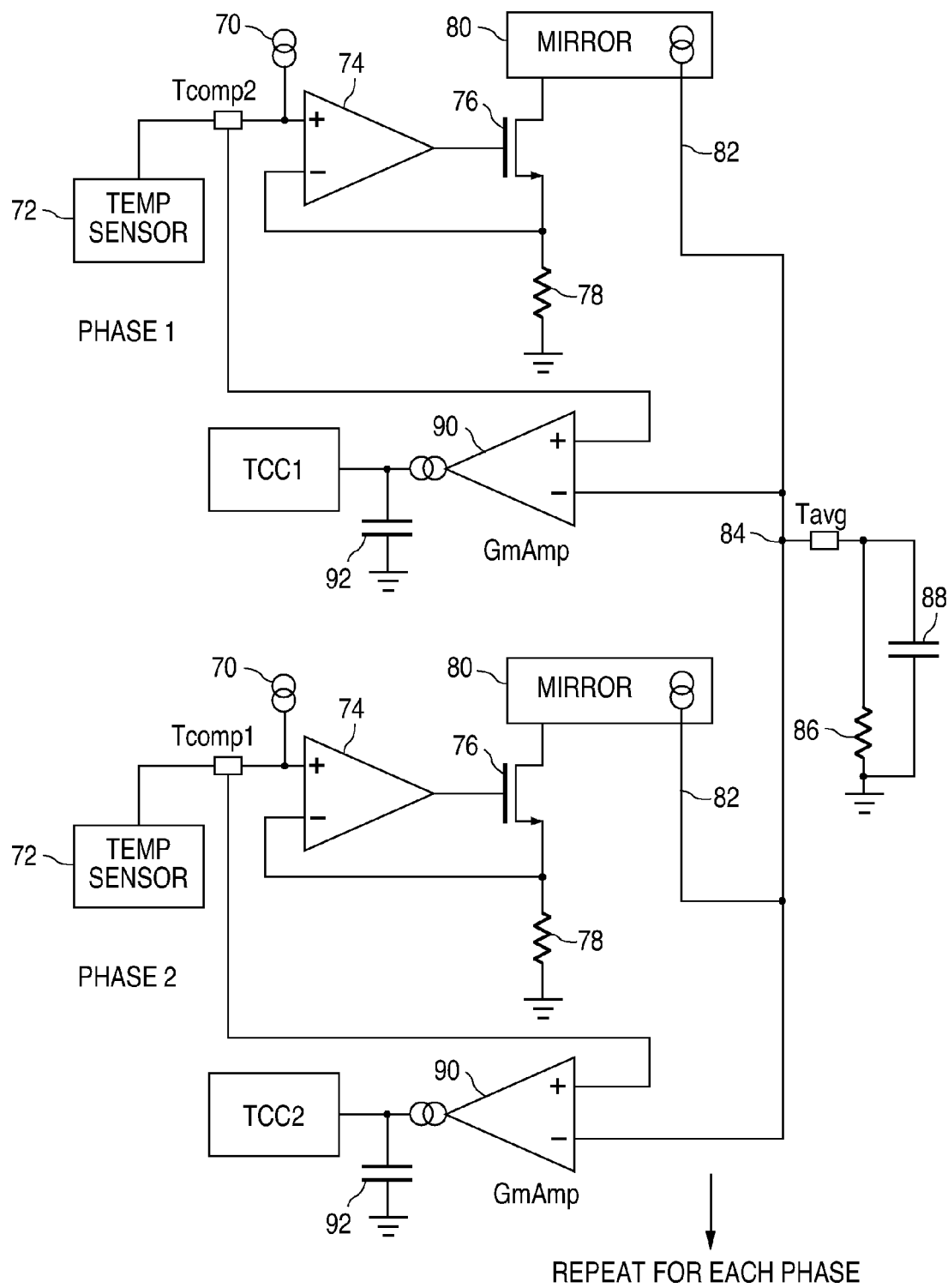
FIG. 2 illustrates the thermal compensation circuits for the various phases.

FIG. 2 illustrates one type of thermal compensation circuit that can be used to generate the TCC 1-TCC 3 signals and the average temperature signal Tavg. The temperature compensation circuits for the phases are substantially identical. Only two compensation circuits are shown in FIG. 2 for simplicity.

A current source 70 generates a current through a temperature sensor 72 to create a first signal at the pin Tcomp1. The sensor 72 may be a negative temperature coefficient (NTC) resistor connected to ground. In another embodiment, the temperature sensor may comprise a pn junction and related circuitry, where the known effect of temperature on the conductance of a pn junction is converted into a corresponding signal. Temperature sensor ICs are commercially available and may also be used.

The current source 70 is trimmed, such as by blowing fuses during fabrication, so that the signals at pins Tcomp1 and Tcomp2 are identical when the sensors 72 are at the same temperature.

The voltage signals at the Tcomp1 and Tcomp2 pins are converted into corresponding currents by the voltage-to-current conversion circuit formed by a differential amplifier 74, MOSFET 76, and resistor 78. The current through the resistor 78 is that needed to cause the resulting voltage across it to equal the signal at the Tcomp1 pin (equalizing the voltages at the inputs of the differential amplifier 74). The same voltage-to-current converter technique may be used in the Vc to Ic converter circuits 56 in FIG. 1 to convert the control voltage Vc to the current Ic.

A conventional current mirror circuit 80 generates the same or a scaled current at an output 82. The current mirror circuits 80 for the various phases are trimmed during fabrication so that their outputs are the same when the temperature sensors 72 are at the same temperatures.

The currents output by the current mirror circuits 80 for the various phases are summed at node 84, and the summed currents flow through the resistor 86. The resulting voltage at the pin Tavg corresponds to the average temperature for all of the phases. The value of the resistor 86 is selected such that the level of the voltage at the pin Tavg is equal to the level of the voltage at the Tcomp1 and Tcomp2 pins when the temperatures of the sensors 72 are equal (i.e., when each sensor 72 senses the average temperature)

The capacitor 88 is a smoothing capacitor to prevent perturbations.

The signal at the Tcomp1 pin and the signal at the Tavg pin are applied to a transconductance amplifier 90, which converts the difference into a corresponding positive or negative current. The capacitor 92 is relatively small and is used for noise filtering.

The currents generated by the transconductance amplifiers 90 are used to offset the Ic signals generated at each phase in FIG. 2. Therefore, the thermal compensation circuits will offset Ic for each phase to cause the inputs at the transconductance amplifier 90 (FIG. 2) to substantially match. Higher duty cycles increase the average currents in a phase, and an increase in the average current will raise the temperature of the inductor and switch for that phase. Accordingly, if the signal at the pin Tcomp1 is higher than the signal at the pin Tavg, the thermal compensation circuit will subtract current from the Ic signal to reduce the duty cycle of that phase to lower its temperature. This will, in turn, affect the output voltage Vo and the average temperature, so the control voltage Vc and the duty cycles of the other phases will be affected. Eventually, a steady state will be reached where the output voltage is at the desired voltage and the duty cycles of the various phases are adjusted so that the sensed temperatures of the phases are equal. The time constant of the thermal compensation feedback loop is relatively long to avoid oscillations.

If the DC/DC converters use synchronous rectifier MOSFETs, it is preferable to locate the temperature sensors 72 proximate to those MOSFETs. Some MOSFET modules are formed with an integral thermal sensor. Alternatively, the temperature of the inductor or the topside power switch can be measured.

Figure 3:
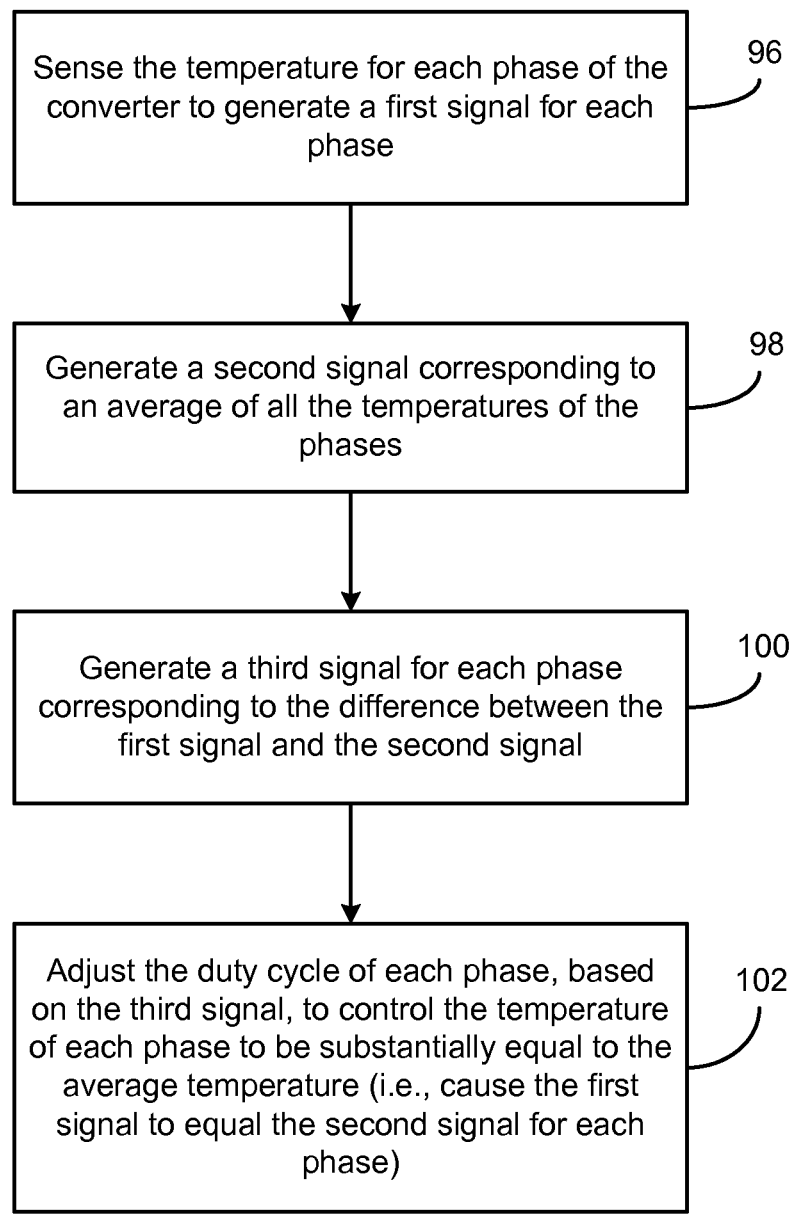
FIG. 3 is a flow chart of the inventive technique in accordance with one embodiment of the invention.

FIG. 3 is a flowchart of the thermal compensation process.

In step 96, the temperature for each phase in the converter is sensed to generate corresponding first signals for all the phases.

In step 98, the first signals are averaged to generate a second signal.

In step 100, for each phase, a third signal is generated for each phase corresponding to the difference between the first signal and the second signal.

In step 102, the third signal is then used to adjust the duty cycle of each phase to control the temperature of each phase to be substantially equal to the average temperature (i.e., cause the first signal to equal the second signal for each phase). Some duty cycles may be increased while other duty cycles may be decreased. In the steady state, the output voltage of the converter will be the desired voltage and the temperatures of the phases will be balanced.

In one embodiment, multiple converter phases are formed on a single chip housed in a surface mounted package with pins for externally connected inductors, transistor switches, and capacitors. The temperature sensor may be an external sensor mounted proximate to the inductor or switch on a circuit board. The remainder of the thermal compensation circuit (for all phases) may be formed as a single chip or in the converter chip itself. This allows the components in the thermal compensation circuits to be easily trimmed so that the compensation circuits for the phases are substantially identical.

The thermal compensation circuits may be formed as a separate product to be used with any type of DC/DC converter.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A thermal compensation circuit for controlling duty cycles of a multi-phased DC/DC converter, the converter comprising a plurality of phased portions, each phased portion comprising a switch controlled to have a duty cycle, an on-time of the switch supplying a current through an inductor, the on-time being controlled by at least an output voltage feedback signal, the thermal compensation circuit comprising:
   a duty-cycle adjustment circuit for each phased portion, the duty-cycle adjustment circuit sensing a temperature of each phased portion and adjusting the duty-cycle of each phased portion such that temperature differences between the plurality of phased portions are reduced,
   wherein the duty-cycle adjustment circuit comprises:
      a temperature sensor circuit for each phased portion, the temperature sensor circuit measuring a temperature proximate to its associated phased portion and generating a separate first signal for each phased portion corresponding to the temperature of that phased portion;
      an averaging circuit for generating a second signal corresponding to an average of temperatures measured at the plurality of phased portions;
      a temperature difference circuit for each phased portion generating a third signal for each phased portion corresponding to a difference between the first signal and the second signal; and
      wherein the duty-cycle adjustment circuit for each phased portion adjusts the duty-cycle of each phased portion based on the third signal to reduce a magnitude of the third signal for each phased portion such that temperatures of the plurality of phased portions are substantially equal to the average of temperatures measured at the plurality of phased portions.

2. The thermal compensation circuit of claim 1 wherein the on-time of the switch in the converter for each phased portion is initiated by a clock signal having a different phase for each of the phased portions.

3. The thermal compensation circuit of claim 1 wherein the averaging circuit comprises:
   a voltage to current conversion circuit for each first signal in each phased portion;
   a current summing circuit for summing currents generated by the voltage to current conversion circuit for each first signal in each phased portion; and
   a resistance for converting currents summed by the current summing circuit to the second signal corresponding to an average of temperatures measured at the plurality of phased portions.

4. The thermal compensation circuit of claim 1 wherein the temperature difference circuit for each phased portion comprises a transconductance amplifier detecting a difference between the first signal and the second signal for each of the phased portions to generate the third signal.

5. The thermal compensation circuit of claim 1 wherein the converter comprises a synchronous rectifier for each phased portion, and wherein the temperature sensor circuit for each phased portion measures a temperature proximate to the synchronous rectifier.

6. The thermal compensation circuit of claim 1 wherein the temperature sensor circuit for each phased portion measures a temperature proximate to the inductor.

7. The thermal compensation circuit of claim 1 wherein the converter is a peak current control converter.

8. A thermal compensation circuit for controlling duty cycles of a multi-phased DC/DC converter, the converter comprising a plurality of phased portions, each phased portion comprising a switch controlled to have a duty cycle, an on-time of the switch supplying a current through an inductor, the on-time being controlled by at least an output voltage feedback signal, the thermal compensation circuit comprising:
   a duty-cycle adjustment circuit for each phased portion, the duty-cycle adjustment circuit sensing a temperature of each phased portion and adjusting the duty-cycle of each phased portion such that temperature differences between the plurality of phased portions are reduced,
   wherein the converter generates a control voltage based on a level of an output voltage of the converter, the duty cycle adjustment circuit comprising:
   a voltage to current conversion circuit for each of the phased portions converting the control voltage to a control current for each phased portion; and
   a current offset circuit for offsetting the control current for each of the phased portions, to generate an offset control current,
   wherein the offset current for each of the phased portions controls the duty cycle of each phased portion.

9. The thermal compensation circuit of claim 1 wherein portions of the converter are formed on a first integrated circuit chip and portions of the temperature compensation circuit are also formed on the first integrated circuit chip.

10. A method performed by a multi-phased DC/DC converter comprising:

supplying currents from a plurality of phased portions of the converter, each phased portion having a duty cycle to generate an output voltage at an output of the converter;

sensing a temperature for each phased portion to generate corresponding first signals for all the phases;

averaging the first signals to generate a second signal corresponding to an average temperature of the phased portions, wherein averaging the first signals to generate the second signal comprises:

converting the first signal in each phased portion to a current for each phased portion;

summing the current from each phased portion to generate a summed current; and converting the summed current to a voltage, the voltage being the second signal corresponding to an average of temperatures measured at the plurality of phased portions;

generating a third signal for each phased portion corresponding to the difference between the first signal and the second signal; and adjusting the duty cycle of each phased portion based on the third signal to control the temperature of each phased portion to be substantially equal to the average temperature of the phased portions sensed at the phased portions.

11. The method of claim 10 wherein sensing the temperature comprises sensing the temperature with a temperature sensor circuit for each phased portion, the temperature sensor circuit measuring a temperature proximate to its associated phased portion and generating the first signal for each phased portion corresponding to the temperature of that phased portion.

12. The method of claim 10 wherein supplying currents from a plurality of phased portions of the converter comprises:

controlling a switch in each phased portion to have a duty cycle, an on-time of the switch supplying a current through an inductor, the on-time being controlled by at least an output voltage feedback signal such that the output voltage of the converter is regulated to be substantially constant in a steady state.

13. The method of claim 12 wherein the on-time of the switch in the converter for each phased portion is initiated by a clock signal having a different phase for each of the phased portions.

14. The method of claim 10 wherein generating a third signal for each phased portion corresponding to the difference between the first signal and the second signal comprises detecting a difference between the first signal and the second signal by a transconductance amplifier for each of the phased portions to generate the third signal.

15. The method of claim 10 wherein the converter comprises a synchronous rectifier for each phased portion, and wherein sensing the temperature for each phased portion measures a temperature proximate to the synchronous rectifier.

16. The method of claim 10 wherein the converter comprises an inductor for each phased portion, and wherein sensing the temperature for each phased portion measures a temperature proximate to the inductor.

17. The method of claim 10 wherein the converter is a peak current control converter.

18. A method performed by a multi-phased DC/DC converter comprising:

supplying currents from a plurality of phased portions of the converter, each phased portion having a duty cycle to generate an output voltage at an output of the converter;

sensing a temperature for each phased portion to generate corresponding first signals for all the phases;

averaging the first signals to generate a second signal corresponding to an average temperature of the phased portions;

generating a third signal for each phased portion corresponding to the difference between the first signal and the second signal; and adjusting the duty cycle of each phased portion based on the third signal to control the temperature of each phased portion to be substantially equal to the average temperature of the phased portions sensed at the phased portions, wherein the converter generates a control voltage based on a level of the output voltage of the converter, wherein adjusting the duty cycle of each phased portion comprises:

converting the control voltage to a control current for each phased portion; and offsetting the control current for each of the phased portions, to generate an offset control current, wherein the offset current for each of the phased portions controls the duty cycle of each phased portion.

* * * * *